(12) United States Patent
Lee

(10) Patent No.: US 8,122,276 B2
(45) Date of Patent: Feb. 21, 2012

(54) APPARATUS AND METHOD FOR DYNAMIC CLOCK CONTROL IN A PIPELINE SYSTEM

(75) Inventor: Kang-Min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 608 days.

(21) Appl. No.: 12/188,481

(22) Filed: Aug. 8, 2008

(65) Prior Publication Data

US 2009/0044038 A1  Feb. 12, 2009

(30) Foreign Application Priority Data

Aug. 10, 2007  (KR) ........................ 10-2007-0080487

(51) Int. Cl.
*G06F 1/08* (2006.01)
(52) U.S. Cl. ........................................ 713/500; 713/322
(58) Field of Classification Search .................. 710/300, 710/322–323, 400–401, 500–501; 713/300, 713/322–324, 400–401, 500–501, 600
See application file for complete search history.

(56) References Cited

U.S. PATENT DOCUMENTS

| | | | |
|---|---|---|---|
| 5,572,719 A | | 11/1996 | Biesterfeldt |
| 5,600,792 A | * | 2/1997 | Pockrandt et al. ............. 714/47 |
| 6,370,676 B1 | * | 4/2002 | Hayashi et al. ............... 714/736 |
| 6,618,816 B1 | * | 9/2003 | Ido et al. ........................ 713/503 |
| 6,633,995 B1 | * | 10/2003 | Nam ............................. 713/600 |
| 7,017,064 B2 | * | 3/2006 | Thomas et al. ............... 713/400 |
| 7,076,682 B2 | | 7/2006 | Jacobson |
| 7,245,172 B2 | * | 7/2007 | Boerstler et al. .............. 327/333 |
| 7,373,091 B2 | * | 5/2008 | Moeller ........................ 398/204 |
| 7,406,588 B2 | * | 7/2008 | Lin et al. ....................... 712/219 |
| 7,421,606 B2 | * | 9/2008 | Kim ............................... 713/401 |
| 7,724,056 B2 | * | 5/2010 | Miki et al. .................... 327/175 |
| 7,812,654 B2 | * | 10/2010 | Kim et al. ..................... 327/158 |
| 7,890,782 B2 | * | 2/2011 | Abernathy et al. ........... 713/300 |
| 2004/0210742 A1 | | 10/2004 | Levitan et al. |
| 2008/0191768 A1 | * | 8/2008 | Miki et al. .................... 327/175 |
| 2010/0085823 A1 | * | 4/2010 | Carpenter et al. ............ 365/194 |
| 2011/0010564 A1 | * | 1/2011 | Thomas et al. ............... 713/189 |

FOREIGN PATENT DOCUMENTS

KR  10-2002-0064158 A  8/2002
WO  97/01811 A2  1/1997

* cited by examiner

*Primary Examiner* — Raymond Phan
(74) *Attorney, Agent, or Firm* — Jefferson IP Law, LLP

(57) ABSTRACT

An apparatus and method for dynamically controlling a clock signal in a pipeline system are provided. In the apparatus and method, a clock generator outputs the clock signal at every period, a PDR is included with each stage for outputting information about a processing speed of each stage, and a CCU controls the delay of the clock signal using the processing time of each stage received from the PDR and providing the clock signal with the controlled delay to a register between stages. Accordingly, the clock signal is dynamically controlled to provide higher operating speeds.

13 Claims, 12 Drawing Sheets

APPARATUS AND METHOD FOR DYNAMIC CLOCK CONTROL IN A PIPELINE SYSTEM

PRIORITY

This application claims the benefit under 35 U.S.C. §119 (a) of a Korean patent application filed in the Korean Intellectual Property Office on Aug. 10, 2007 and assigned Serial No. 2007-80487, the entire disclosure of which is hereby incorporated by reference.

BACKGROUND OF THE INVENTION

1. Field of the Invention

The present invention generally relates to a dynamic clock control apparatus and method in a pipeline system. More particularly, the present invention relates to an apparatus and method for increasing system performance by controlling a clock signal of a pipeline structure.

2. Description of the Related Art

With reference to FIG. 1, a typical synchronous digital system will be described below. Referring to FIG. 1, a conventional synchronous digital system has an input port, an output port, a combinational logic circuit 110 for processing data for a predetermined purpose, an input register 102, and an output register 104. The combinational logic circuit 110, the input register 102, and the output register 104 are located between the input port and the output port. Furthermore, the input register 102 and the output register 104 are configured with flip-flops or latches that are synchronized by a clock signal. The conventional synchronous digital system also includes a clock generator 100 for generation of the clock signal that is provided to the input register 102 and the output register 104.

To improve performance, most processors or digital blocks use a 'pipeline structure' as illustrated in FIG. 2. The pipeline structure divides the combinational logic circuit 110 of the digital system illustrated in FIG. 1. FIG. 2 illustrates the configuration of a conventional synchronous digital system with a pipeline structure, i.e. a conventional synchronous pipeline system. Referring to FIG. 2, the combinational logic circuit of the synchronous digital system includes four divided combinational logic circuits 222, 224, 226 and 228, each having input and output registers that are formed with flip-flops. More specifically, combinational logic circuit 222 includes register 202 as an input register and register 204 as an output register, combinational logic circuit 224 includes register 204 as an input register and register 206 as an output register, combinational logic circuit 226 includes register 206 as an input register and register 208 as an output register and combinational logic circuit 228 includes register 208 as an input register and register 210 as an output register. As illustrated, each of registers 204, 206 and 208, which are located between combinational logic circuits, functions as an output register for the previous combinational logic circuit and an input register for the following combinational logic circuit. As further illustrated, the combinational logic circuit of FIG. 2 also includes a clock generator 200 for generation of a clock signal to be provided to the registers.

The synchronous digital system of the pipeline structure illustrated in FIG. 2 allows for an increase in an operation speed (clock speed) as well as the processing of a plurality of data simultaneously because the four-pipeline structure of FIG. 2 can perform up to four successive processes at the same time.

As illustrated in FIG. 2, the conventional synchronous pipeline structure is designed such that a clock signal input to each pipeline register is identical in frequency and phase. Therefore, the frequency of the clock signal is determined by a stage taking the longest processing time among pipeline stages each being defined by a combinational logic circuit and input and output registers. For example, if the combinational logic circuits 222, 224, 226 and 228 forming stage 1 to stage 4 take processing times of 11, 13, 16, and 9 nsec, respectively, stage 3 with the longest processing time determines the clock speed of the system (1/16 nsec=62.5 MHz).

One reason that causes the different processing times in the different stages is that a different function is performed in each stage. One of many techniques for minimizing the difference between processing times will be described below with reference to FIG. 3.

FIG. 3 illustrates the configuration of a conventional synchronous pipeline system similar to that of FIG. 2. However, the pipeline system of FIG. 2 further provides for reducing the processing time difference between stages by delaying a clock signal. Referring to FIG. 3, a time delay ($T_d$) 302 delays a clock signal generated from a clock generator 200 by a time period and provides the delayed clock signal to one or more registers, thereby narrowing the difference in processing time between stages. For example, if the synchronous pipeline system illustrated in FIG. 3 has a target operation frequency of 100 MHz (a period of 10 nsec) and processing time estimates of first to fourth stages are 8, 9, 11, and 7 nsec, respectively, a clock signal input to a register 208 between stage 3 and stage 4 is artificially delayed by 1 to 3 nsec (herein, the medium value 2 nsec, by way of example). The artificial delaying of the clock signal input to the output register 208 of stage 3 by $T_d$ (2 nsec) prolongs the processing time of stage 3 to $T_{clk}+T_d$. This method for borrowing time to be used for stage 4 for use in stage 3 is called a time borrowing technique. The time borrowing technique is widely adopted for a high-performance digital microprocessor or a digital system block.

In order to effectively apply the time borrowing technique, the estimation of the processing time of each stage must be accurate. This is also true for other techniques used to narrow a time difference between stages. However, since the techniques for reducing a time difference between stages are applied during a chip design, that is, before actual time differences can be measured on the fabricated chip, it is difficult to estimate the processing time accurately. Moreover, as a chip fabrication processes become highly divided, the impact of process tolerances increases rapidly. Also, an increased integration leads to more severe electrical coupling from a neighbor circuit. As a consequence, it is more difficult to determine the physical characteristics of a chip accurately during the chip design. Furthermore, post-fabrication revision regarding performance/power is not supported.

Accordingly, there exists a need for using the processing times of stages based on post-chip fabrication measurements rather than the less accurate estimates calculated during a chip design.

SUMMARY OF THE INVENTION

An aspect of the present invention is to address at least the above-mentioned problems and/or disadvantages and to provide at least the advantages described below. Accordingly, an aspect of exemplary embodiments of the present invention is to provide a dynamic clock control apparatus and method in a pipeline system.

Another aspect of the present invention is to provide an apparatus and method for improving system performance or decreasing power by controlling the delay of a clock signal in a pipeline digital system.

A further aspect of the present invention is to provide an apparatus and method for enabling a system operation at a constant power supply voltage in a higher clock frequency or enabling a system operation at a lower power supply voltage in a constant clock frequency by delaying or advancing a clock signal input to each pipeline stage in a digital system using a plurality of pipelines.

In accordance with an aspect of the present invention, a pipeline system for dynamically controlling a clock signal is provided. The system includes a clock generator for outputting the clock signal at every predetermined period, a PDR added to each stage for outputting information about a processing speed of the each stage, and a CCU for controlling the delay of the clock signal by using the processing time of each stage received from the PDR and providing the clock signal with the controlled delay to a register between stages.

In accordance with another aspect of the present invention, a method for dynamically controlling a clock signal in a pipeline system is provided. The method includes determining a clock period of the pipeline system, determining a processing time of each stage included in the pipeline system, and controlling the delay of the clock signal input to a register between stages taking into account the processing time of each stage, if there is a stage with a processing time longer than the clock period.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
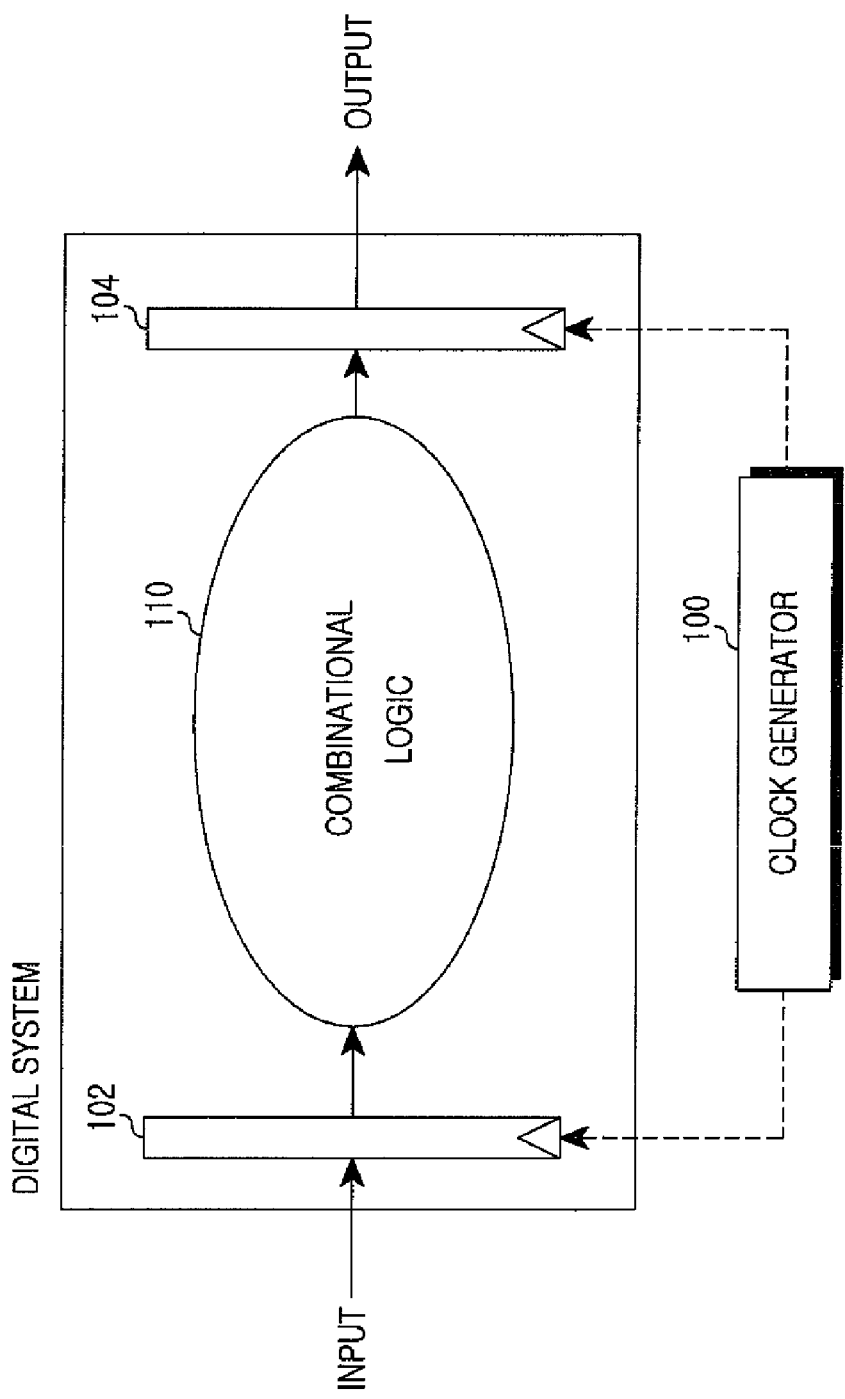
FIG. 1 illustrates the configuration of a conventional synchronous digital system.
Figure 2:
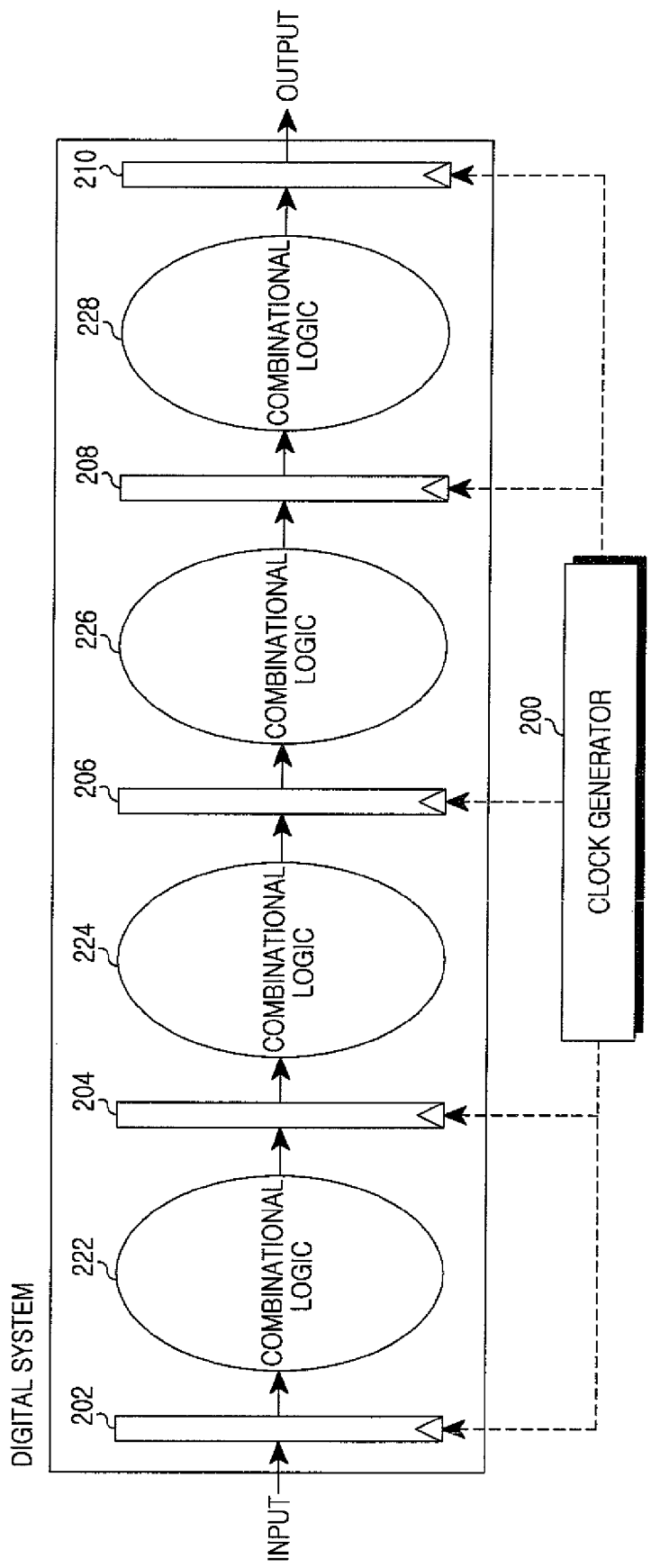
FIG. 2 illustrates the configuration of a conventional synchronous digital system with a pipeline structure.
Figure 3:
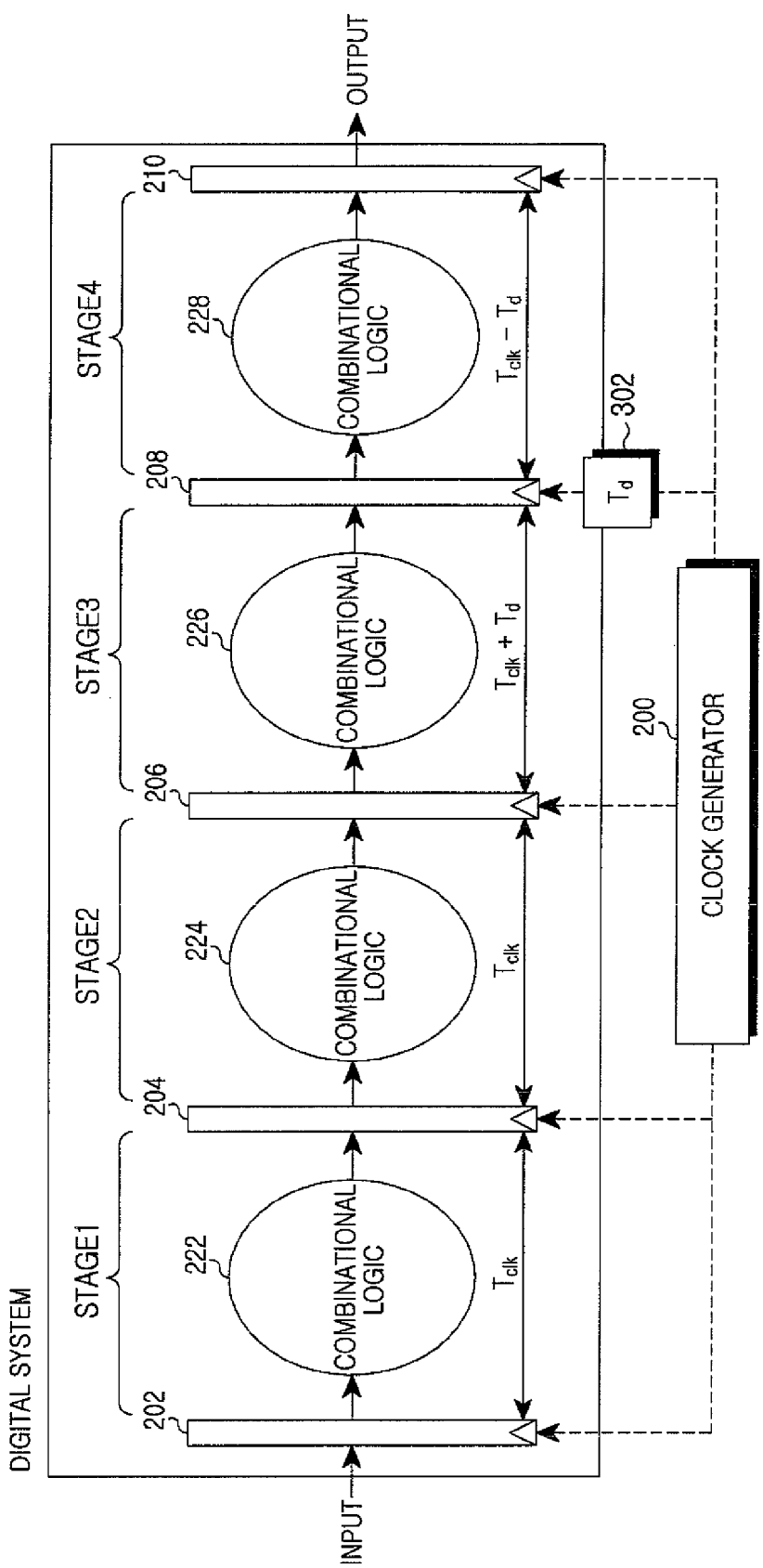
FIG. 3 illustrates the configuration of a conventional synchronous pipeline system for reducing the processing time difference between stages by use of the delay of a clock signal.
Figure 4:
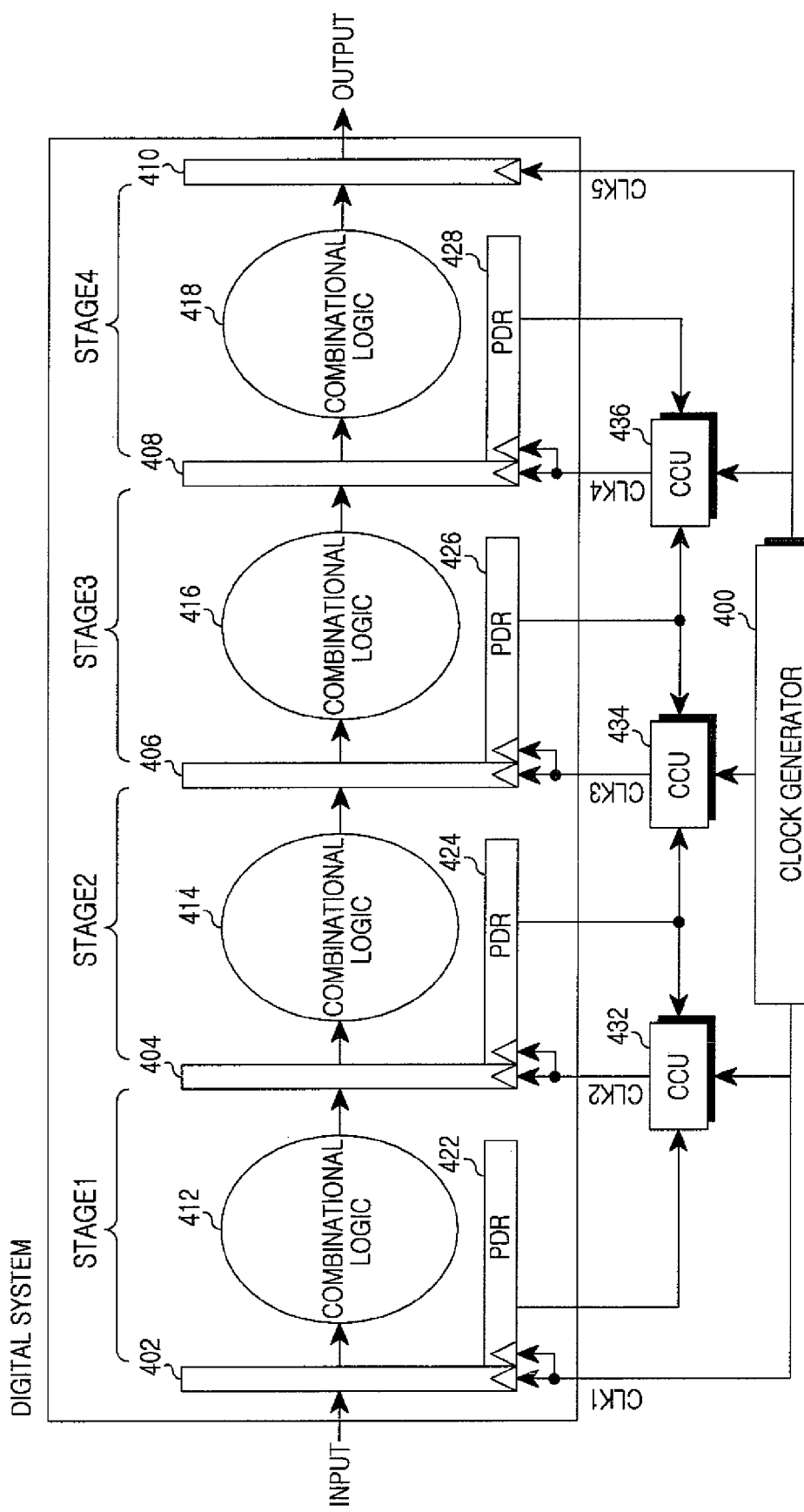
FIG. 4 illustrates the configuration of a synchronous pipeline system for controlling a clock signal using an actual processing time measurement of each stage according to an exemplary embodiment of the present invention.

Exemplary embodiments of the present invention are intended to provide an apparatus and method for enabling a system operation at a constant power supply voltage in a higher clock frequency or enabling a system operation at a lower power supply voltage in a constant clock frequency by delaying or advancing a clock signal input to a pipeline stage in a digital system using a plurality of pipelines. With reference to FIG. 4, an exemplary apparatus of the present invention will be described below.

FIG. 4 illustrates the configuration of a synchronous pipeline system for controlling a clock signal using an actual processing time measurement according to an exemplary embodiment of the present invention.

Referring to FIG. 4, an exemplary synchronous pipeline system includes a clock generator 400, a plurality of registers 402, 404, 406, 408 and 410, and a plurality of combinational logic circuits 412, 414, 416 and 418. In accordance with an exemplary embodiment, the synchronous pipeline system further includes Path Delay Replicas (PDRs) 422, 424, 426 and 428 added to respective stages and Clock Control Units (CCUs) 432, 434 and 436.

As illustrated in FIG. 4, each stage includes an input register, a combinational logic circuit, a PDR, and an output register. For example, an input register 402, a combinational logic circuit 412, a PDR 422, and an output register 404 from stage 1.

The PDRs 422, 424, 426 and 428 are devices for outputting information about the processing speed of the combinational logic circuit of each stage. For example, they output information about the fastest path delay which corresponds to the fastest processing speed and the slowest slow path delay which corresponds to the slowest processing speed. The PDRs 422, 424, 426 and 428 will be described below in more detail with reference to FIG. 5.

The CCUs 432, 434 and 436 are devices for controlling the delays of a clock signal input to registers between the combinational logic circuits 412, 414, 416 and 418. Each of the CCUs 432, 434 and 436 receives path signals of stages before and after a respective register from the PDRs of the stages and controls the output of a clock signal input to the respective register. The CCUs 432, 434 and 436 will be described below in more detail with reference to FIG. 6.

While four stages are shown in FIG. 4, this is merely an exemplary application. Thus, it is to be clearly understood that the present invention can be applied to any synchronous pipeline system with at least two stages.

Figure 5:
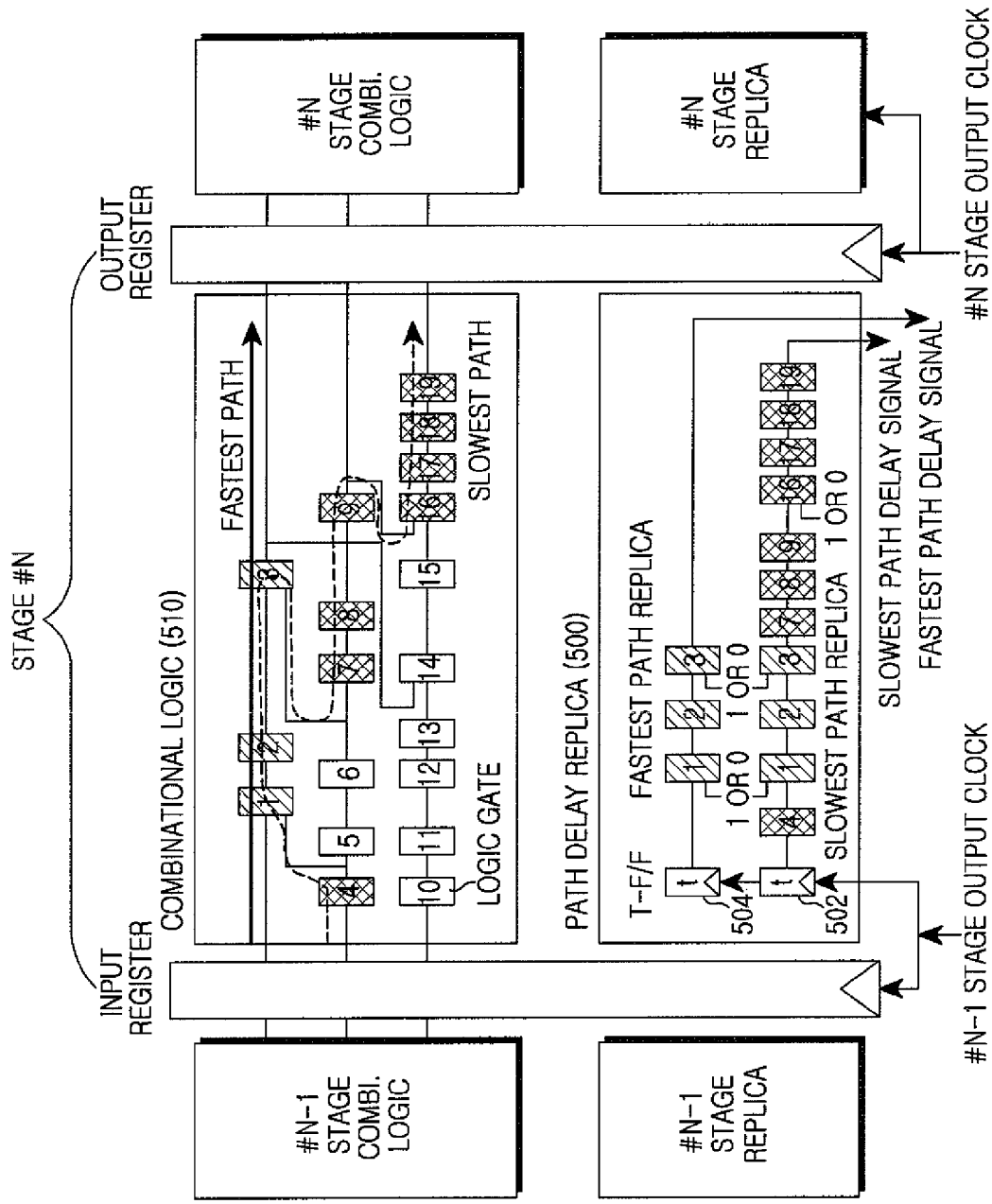
FIG. 5 illustrates the configuration of a path delay replica in a synchronous pipeline system according to an exemplary embodiment of the present invention.

FIG. 5 illustrates the configuration of a PDR in a synchronous pipeline system according to an exemplary embodiment of the present invention.

Referring to FIG. 5, a PDR 500 is designed by first selecting the fastest and slowest paths from among the paths passing through a plurality of logic gates in a corresponding combinational logic circuit 510. Based on the selected paths, the PDR is designed to replicate the same circuits having the fastest and slowest paths. Toggle Flip-Flops (T-F/Fs) 502 and 504 are added to the input ends of the fastest path replica and the slowest path replica, each path including a plurality of logic gates, and a constant of 1 or 0 is input in the course of the paths. By inputting the constant of 1 or 0, the final outputs of the two paths are alternately 0 and 1 at every clock signal and the outputs of the two paths are opposite each other for the same clock signal.

Figure 6:
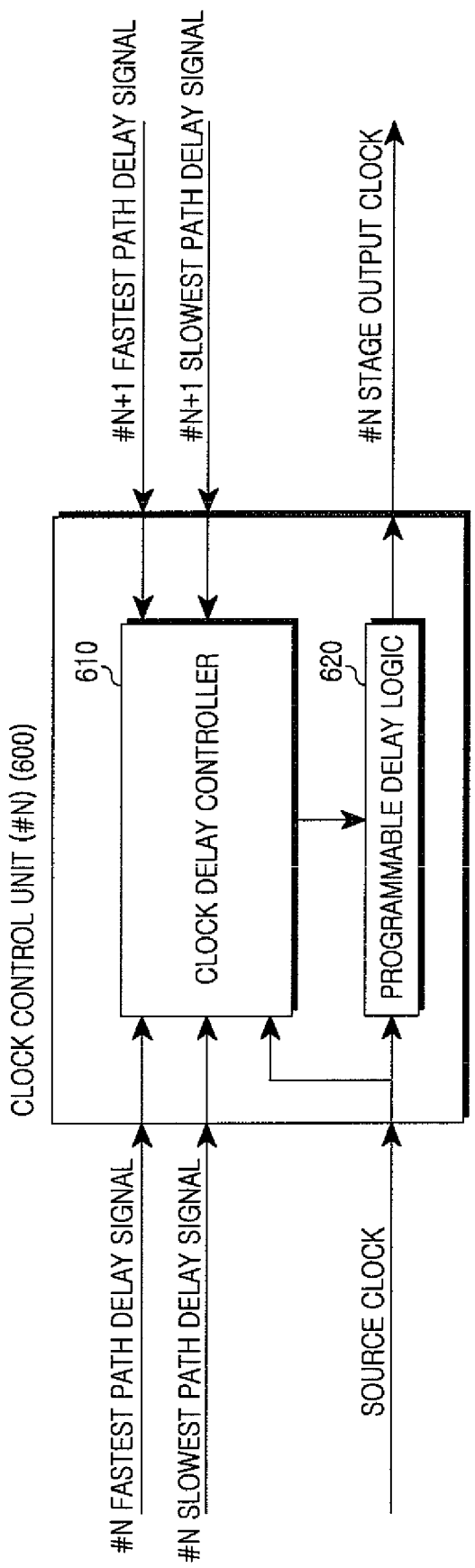
FIG. 6 illustrates the configuration of a clock control unit in a synchronous pipeline system according to an exemplary embodiment of the present invention.

FIG. 6 illustrates the configuration of a CCU in a synchronous pipeline system according to an exemplary embodiment of the present invention.

Referring to FIG. 6, a CCU 600 according to an exemplary embodiment of the present invention includes a clock delay controller 610 and a programmable delay logic circuit 620.

The clock delay controller 610 receives a fastest path delay signal and a slowest path delay signal from the previous stage (#N stage) and determines whether the previous stage is valid with respect to a clock signal. If the previous stage is not valid, the clock delay controller 610 increases the delay of the clock signal. The clock delay controller 610 also receives a fastest path delay signal and a slowest path delay signal from the following stage (#N+1 stage) and determines whether the following stage is valid with respect to the clock signal. If the following stage is not valid, the clock delay controller 610 advances the clock signal, thereby decreasing the delay of the clock signal. A detailed description will be made of the clock delay controller 610 with reference to FIG. 7.

The programmable delay logic circuit 620 receives a clock signal (Source Clock) and delays the received clock signal by the adjusted time under the control of the clock delay controller 610. The programmable delay logic circuit 620 outputs the adjusted clock signal (#N+1 Stage Clock Signal) to its respective stage. A detailed description will be made of the programmable delay logic circuit 620 with reference to FIG. 8.

Figure 7:
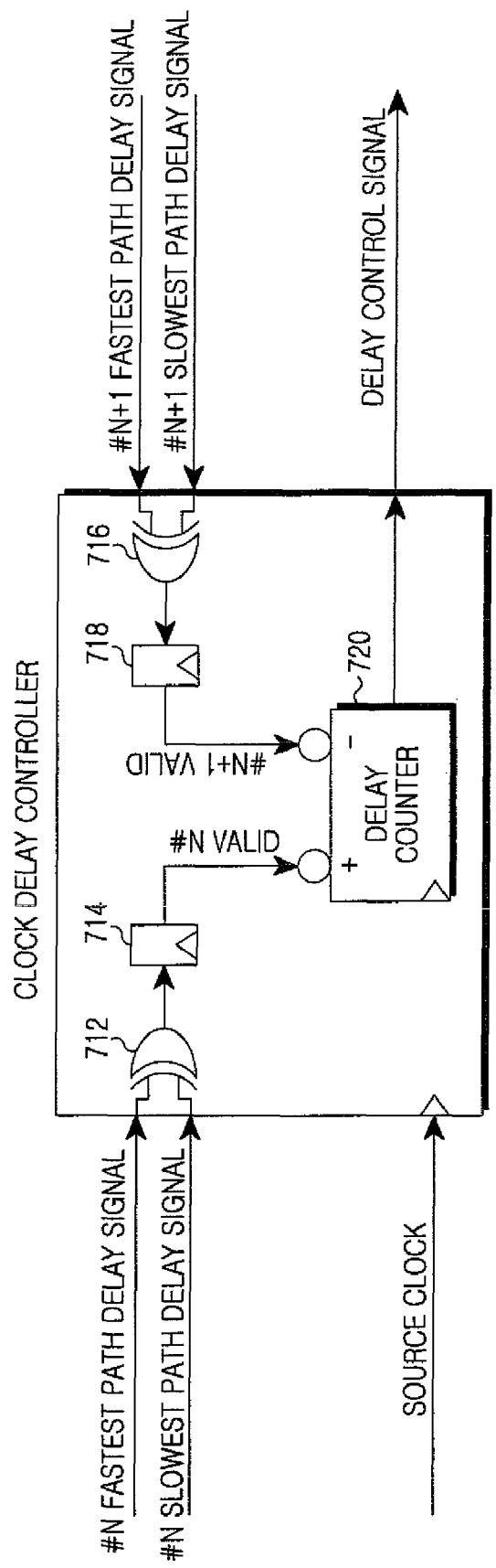
FIG. 7 illustrates the configuration of a clock delay controller in a clock control unit according to an exemplary embodiment of the present invention.

FIG. 7 illustrates the configuration of a clock delay controller in a CCU according to an exemplary embodiment of the present invention. Referring to FIG. 7, the clock delay controller includes exclusive ORs 712 and 716, Data Flip-Flops (D-F/Fs) 714 and 718, and a delay counter 720.

The exclusive OR 712 receives the fastest and slowest path delay signals from the previous stage, performs an exclusive OR-operation on them, and provides the resulting exclusive OR value to the D-F/F 714. The exclusive OR value is '1' if the previous stage is valid for a given clock period and '0' if the previous stage is not valid for the given clock period. The D-F/F 714 provides the received information about validity to the delay counter 720, when a clock signal is generated.

The exclusive OR 716 receives the fastest and slowest path delay signals from the following stage, performs an exclusive OR-operation on them, and provides the resulting exclusive OR value to the D-F/F 718. The exclusive OR value is '1' if the following stage is valid for a given clock period and '0' if the following stage is not valid for the given clock period. The D-F/F 718 provides the received information about validity to the delay counter 720, when a clock signal is generated.

The delay counter 720 receives the validity information from the D-F/Fs 716 and 718 and increases a delay count if the previous stage is not valid and decreases the delay count if the following stage is not valid, thereby adjusting the delay of the clock signal input to a register.

Figure 8:
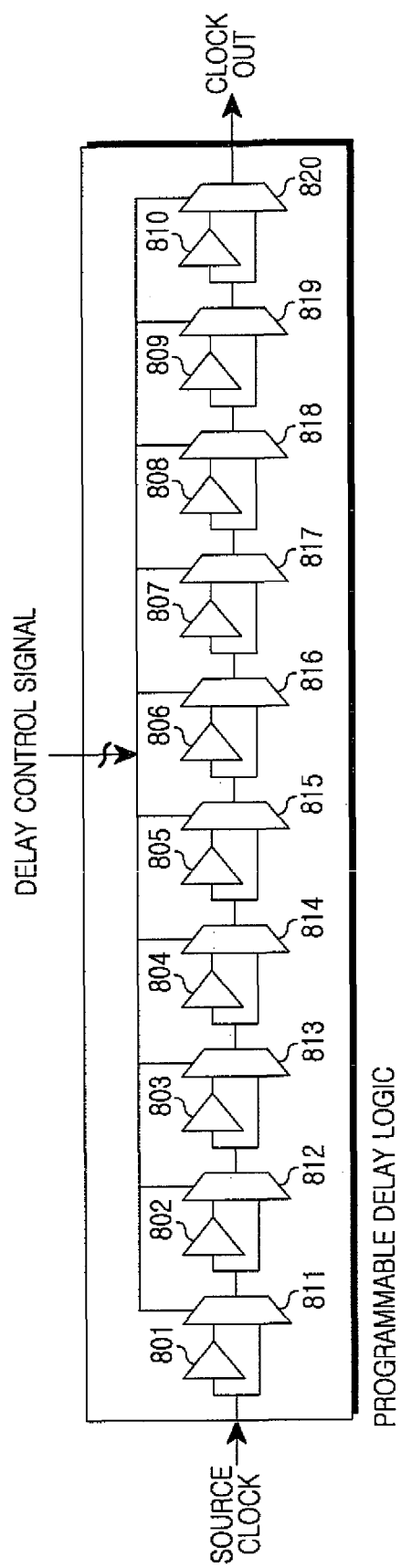
FIG. 8 illustrates the configuration of a programmable delay logic circuit in a clock control unit according to an exemplary embodiment of the present invention.

FIG. 8 illustrates the configuration of a programmable delay logic circuit in a CCU according to an exemplary embodiment of the present invention. Referring to FIG. 8, the programmable delay logic circuit includes a plurality of delays 801 to 810 and a plurality of Multiplexers (MUXes) 811 to 820. Upon receipt of a delay control signal from the clock delay controller, each MUX outputs the clock signal after delaying it by a time period, thus delaying the clock signal by an appropriate time.

A dynamic clock control method in a pipeline system according to an exemplary embodiment of the present invention will be described.

Figure 9:
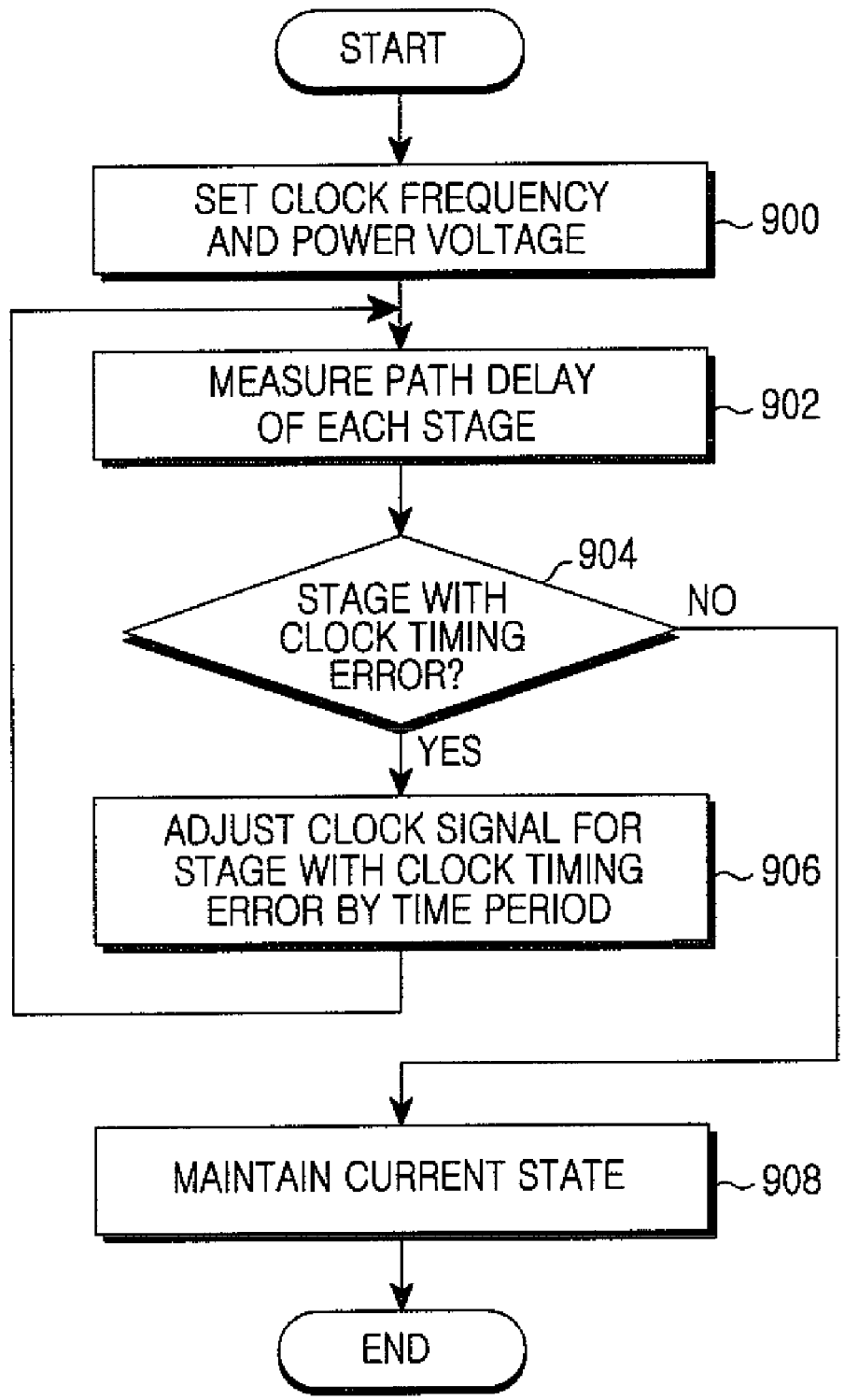
FIG. 9 is a flowchart illustrating an operation for controlling a clock signal using processing time of each stage in a synchronous pipeline system according to an exemplary embodiment of the present invention.

FIG. 9 is a flowchart illustrating an operation for controlling a clock signal using a processing time of each stage in a synchronous pipeline system according to an exemplary embodiment of the present invention.

Referring to FIG. 9, the synchronous pipeline system sets a clock frequency and a power voltage in step 900. In step 902, the synchronous pipeline system determines the path delay of each stage using the PDR of the stage. In step 904, the synchronous pipeline system determines whether there is any stage with a clock timing error. If none of the stages has a clock timing error, the synchronous pipeline system maintains its current state in step 908.

However, if it is determined that there is a stage with a clock timing error in step 904, the synchronous pipeline system adjusts the clock signal of the stage by delaying or advancing the clock signal with the error by a time period in step 906 and returns to step 902. The operation of adjusting the clock signal in step 906 will be explained below in more detail with reference to FIG. 10.

Figure 10:
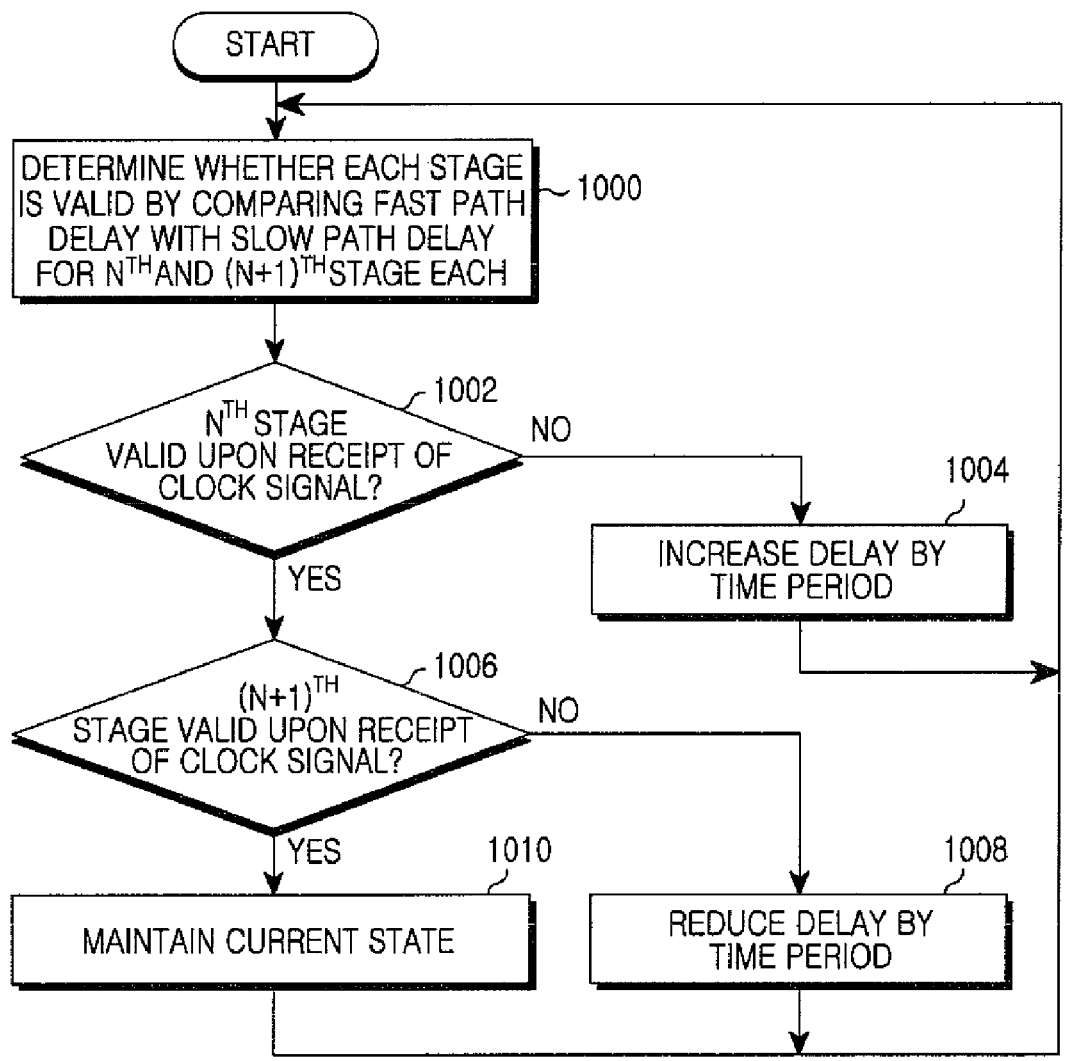
FIG. 10 is a flowchart illustrating an operation for controlling a clock signal using a measured processing time of each stage in a clock control unit in a synchronous pipeline system according to an exemplary embodiment of the present invention.

FIG. 10 is a flowchart illustrating an operation for controlling a clock signal using a measured processing time of each stage in a CCU in a synchronous pipeline system according to an exemplary embodiment of the present invention.

Referring to FIG. 10, the CCU receives actual measurement-based fastest and slowest path delay signals from each of the previous and following stages and determines whether each of the stages is valid by performing an exclusive-OR operation on the fastest and slowest path delay signals of the stage in step 1000. In step 1002, the CCU determines whether the previous stage ($N^{th}$ stage) is valid when receiving a clock signal. If the previous stage is not valid, the CCU increases the delay of the clock signal by a time period in step 1004 and returns to step 1000.

If it is determined that the previous stage is valid in step 1002, the CCU determines whether the following stage ($N+1^{th}$ stage) is valid when receiving a clock signal in step 1006. If the following stage is not valid, the CCU decreases or reduces the delay of the clock signal by a time period in step 1008 and returns to step 1000. On the other hand, if the following stage is valid, the CCU maintains the clock signal in a current state in step 1010. Steps 1000 through 1010 are repeated until each CCU does not need to adjust the clock signal in the synchronous pipeline system.

Now an example of clock control in the exemplary 4-stage pipeline system illustrated in FIG. 4 will be described. In the following example, it is assumed that the pipeline system was designed considering a worst case in which the processing times of the four stages are 7, 8, 8 and 6 nsec, respectively, but the processing times of the stages turn out to be 8, 9, 11 and 7 nsec, respectively after actual chip fabrication. As such, the processing time of stage 3 is of most concern in order to achieve a target operation frequency of 100 MHz. Clock control for the output register of stage 1 with no problems will be described with reference to FIG. 11 and clock control for the output register of problematic stage 3 will be described with reference to FIG. 12.

Figure 11:
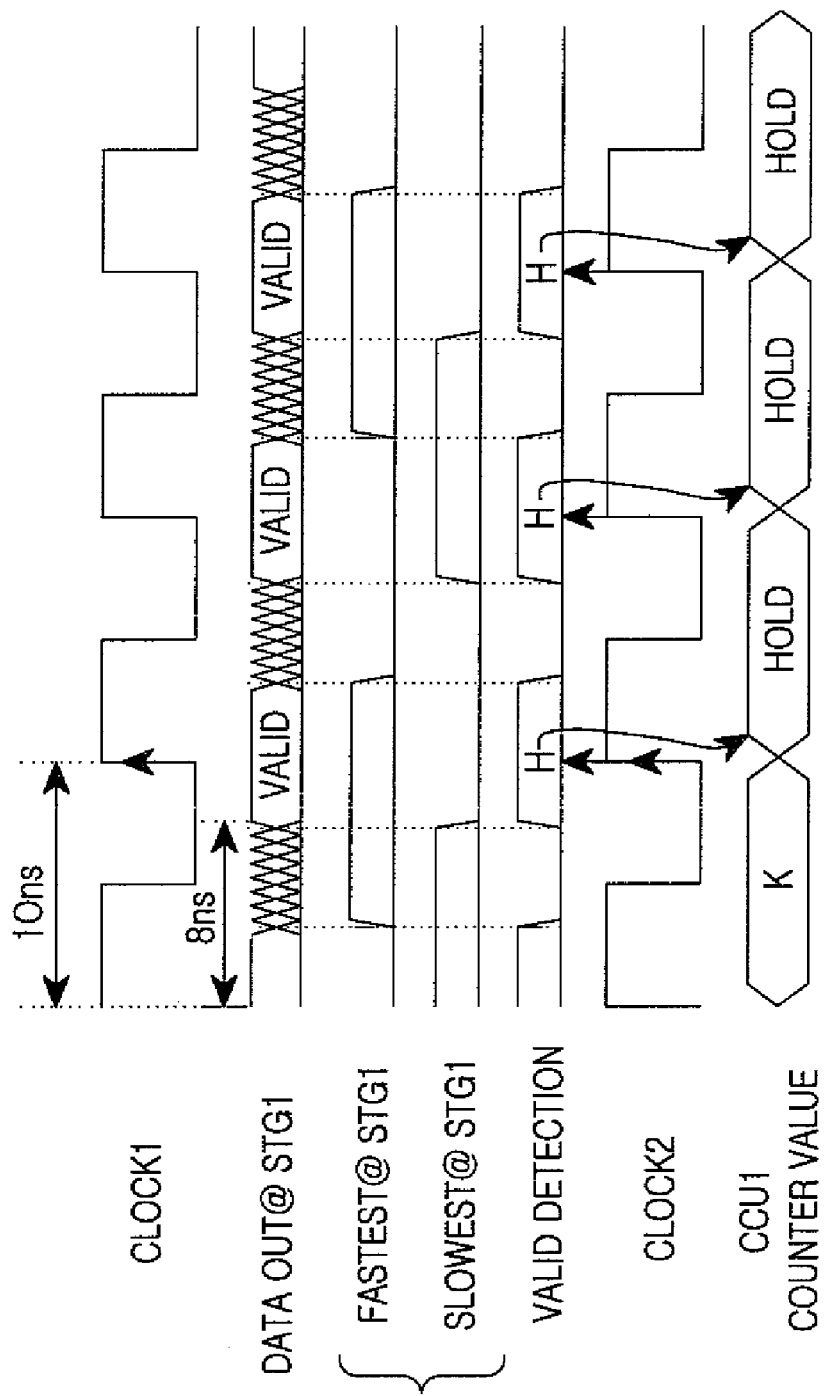
FIG. 11 illustrates an exemplary operation of a clock control unit when a path delay of a stage is shorter than a clock period a synchronous pipeline system according to an exemplary embodiment of the present invention.

FIG. 11 illustrates an exemplary operation of a CCU when a path delay of a stage is shorter than a clock period in a synchronous pipeline system according to an exemplary embodiment of the present invention.

Referring to FIG. 11, the fastest and slowest path delay signals of stage 1 (illustrated in FIG. 4) are shown as a timing diagram. The slowest path delay of stage 1 is 8 nsec, which is shorter than a clock period of 10 nsec. Therefore, no timing error is caused by the clock period.

In this case, the result from an exclusive-OR operation on the fastest and slowest path delay signals is a valid detection signal. When Clock2 is generated (positive edge), the valid detection signal is high, indicating always valid. Therefore, the current clock period is maintained because no clock delay is required.

Figure 12:
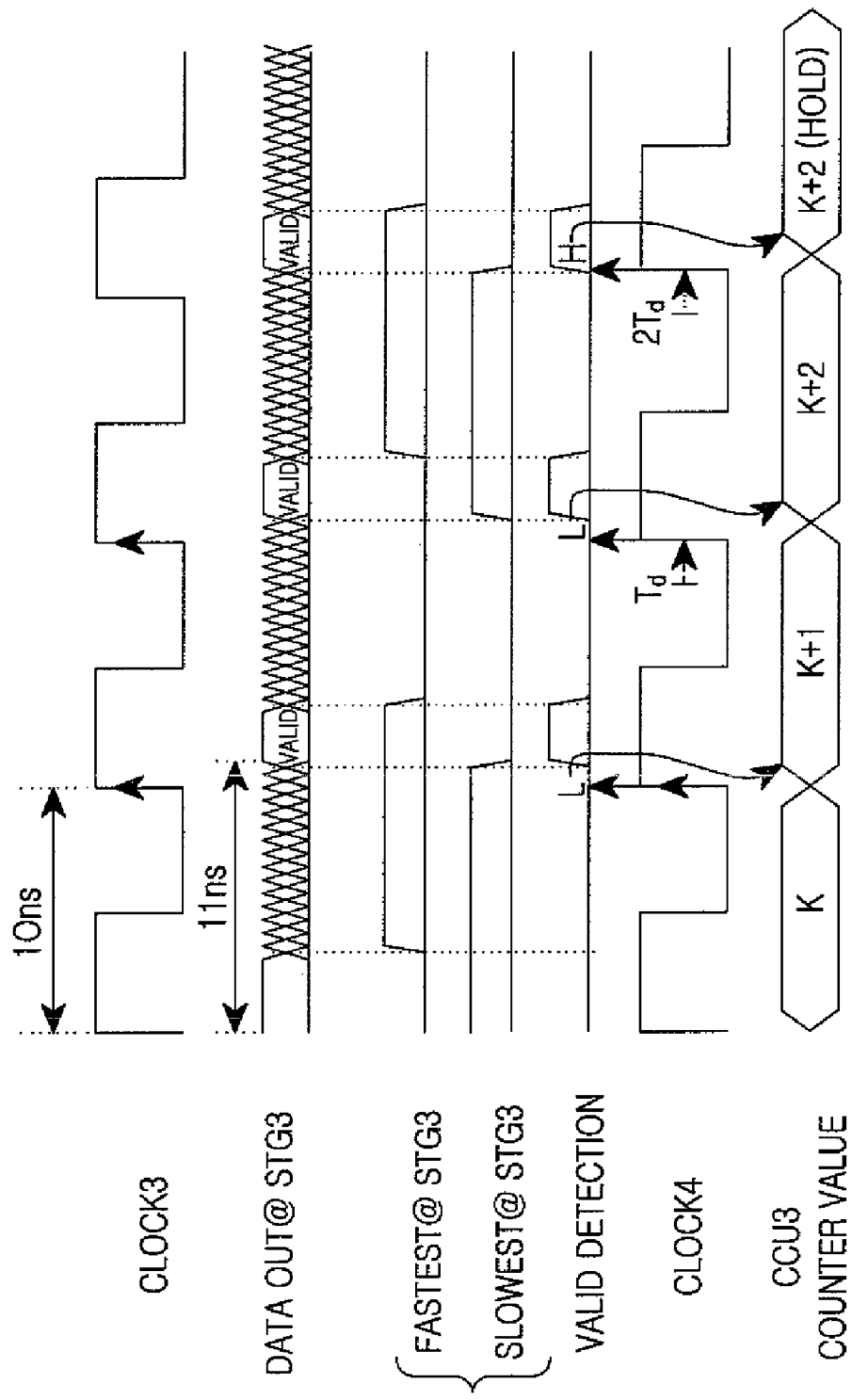
FIG. 12 illustrates an exemplary operation of a clock control unit when a path delay of a stage is longer than a clock period in a synchronous pipeline system according to an exemplary embodiment of the present invention.

FIG. 12 illustrates an exemplary operation of a CCU when a path delay of a stage is longer than a clock period in a synchronous pipeline system according to an exemplary embodiment of the present invention.

Referring to FIG. 12, the fastest and slowest path delay signals of stage 3 are shown as a timing diagram. Again, stage 3 is of most concern because its processing time may undermine the ability to achieve an operation frequency of 100 MHz. That is, the slowest path delay of stage 3 is 11 nsec, which is shorter than the clock period of 10 nsec.

It is noted from FIG. 12 that the valid detection period of stage 3 is not aligned with the generation of Clock4 (positive edge). In this case, the valid detection signal is low, indicating a condition of not valid at the positive edge of Clock4. Hence, the delay counter 720 illustrated in FIG. 7 increases the count value by 1, which means that Clock4 is delayed by an appropriate time period. The delaying is repeated until the valid detection signal becomes high, indicating a condition of valid.

As is apparent from the above description, exemplary embodiments of the present invention provide a dynamic clock control apparatus and method for a pipeline system including a clock generator for outputting a clock signal at every period, PDRs added to respective stages, for outputting information about the processing speed of each stage, and a CCU for controlling the delay of the clock signal received from the clock generator using the processing time of each stage, for input to a register between stages. Because the processing times of the stages are based on actual measurements, the present invention may increase performance and power efficiency.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A pipeline system for dynamically controlling a clock signal, the system comprising:
    a first stage and a second stage;
    a clock generator for outputting a clock signal;
    a plurality of Path Delay Replicas (PDRs) respectively corresponding to one of the first stage and the second stage, each of the PDRs for outputting a processing speed of the respective stage; and
    a Clock Control Unit (CCU) for controlling a delay of the clock signal using the processing speed of the first stage and the second stage received from the respective PDR and providing the clock signal with the controlled delay to a register coupled between the first and second stages.

2. The system of claim 1, wherein both of the first stage and the second stage include a respective combinational logic circuit, and further wherein both of the respective combinational logic circuits include a plurality of paths passing through a plurality of logic gates.

3. The system of claim 1, wherein the CCU comprises:
    a clock delay controller for receiving a fastest path delay signal and a slowest path delay signal from the first stage, for determining whether the first stage is valid with respect to the clock signal, and for controlling the clock signal provided to the register coupled between the first and second stages to be delayed by a time period if the first stage is not valid; and
    a delay logic circuit for delaying the received clock signal under the control of the clock delay controller.

4. The system of claim 2, wherein each of the plurality of PDRs includes replicas of a fastest and a slowest path of the respective stage.

5. The system of claim 3, wherein, if the first stage is valid, the clock delay controller receives a fastest path delay signal and a slowest path delay signal from the second stage, determines whether the second stage is valid with respect to the clock signal, and, if the second stage is not valid, controls the clock signal provided to the register coupled between the first and second stages to be advanced by a time period to reduce the delay of the clock signal.

6. The system of claim 3 wherein the clock delay controller determines whether the respective stage is valid according to an exclusive-OR result of the fastest and slowest path signals of the respective stage, when the clock signal is generated.

7. The system of claim 4, wherein an output of the fastest path has an opposite value to an output of the slowest path for the same input clock signal in each of the plurality of PDRs.

8. A method for dynamically controlling a clock signal in a pipeline system, the method comprising:
    determining the period of a clock signal of the pipeline system;
    determining a processing time of each stage included in the pipeline system; and
    controlling a delay of the clock signal input to a register between stages, taking into account the processing time of each stage, if there is a stage with a processing time longer than the clock period,
    wherein the determining of the processing time of each stage comprises receiving a fastest path delay signal and a slowest path delay signal from a Path Delay Replica (PDR) including replicas of fastest and slowest paths of each stage.

9. The method of claim 8, wherein the fastest and slowest path delay signals have opposite values.

10. The method of claim 8, further comprising maintaining a current state if there is no stage with a processing time longer than the clock period.

11. The method of claim 8, wherein the controlling of the delay comprises:
   receiving a fastest path delay signal and a slowest path delay signal from a previous stage and determining whether the previous stage is valid with respect to the clock signal; and
   delaying the clock signal provided to an output register of the previous stage by a time period if the previous stage is not valid.

12. The method of claim 11, wherein the controlling of the delay further comprises:
   receiving a fastest path delay signal and a slowest path delay signal from a following stage and determining whether the following stage is valid with respect to the clock signal, if the previous stage is valid; and
   advancing the clock signal provided to an input register of the following stage by a time period to reduce the delay of the clock signal, if the following stage is not valid.

13. The method of claim 12, wherein the determining of whether the first stage or the second stage is valid comprises determining whether the respective stage is valid according to an exclusive-OR result of the fastest and slowest path signals of the stage, when the clock signal is generated.

* * * * *